United States Patent Office 3,010,333
Patented Nov. 28, 1961

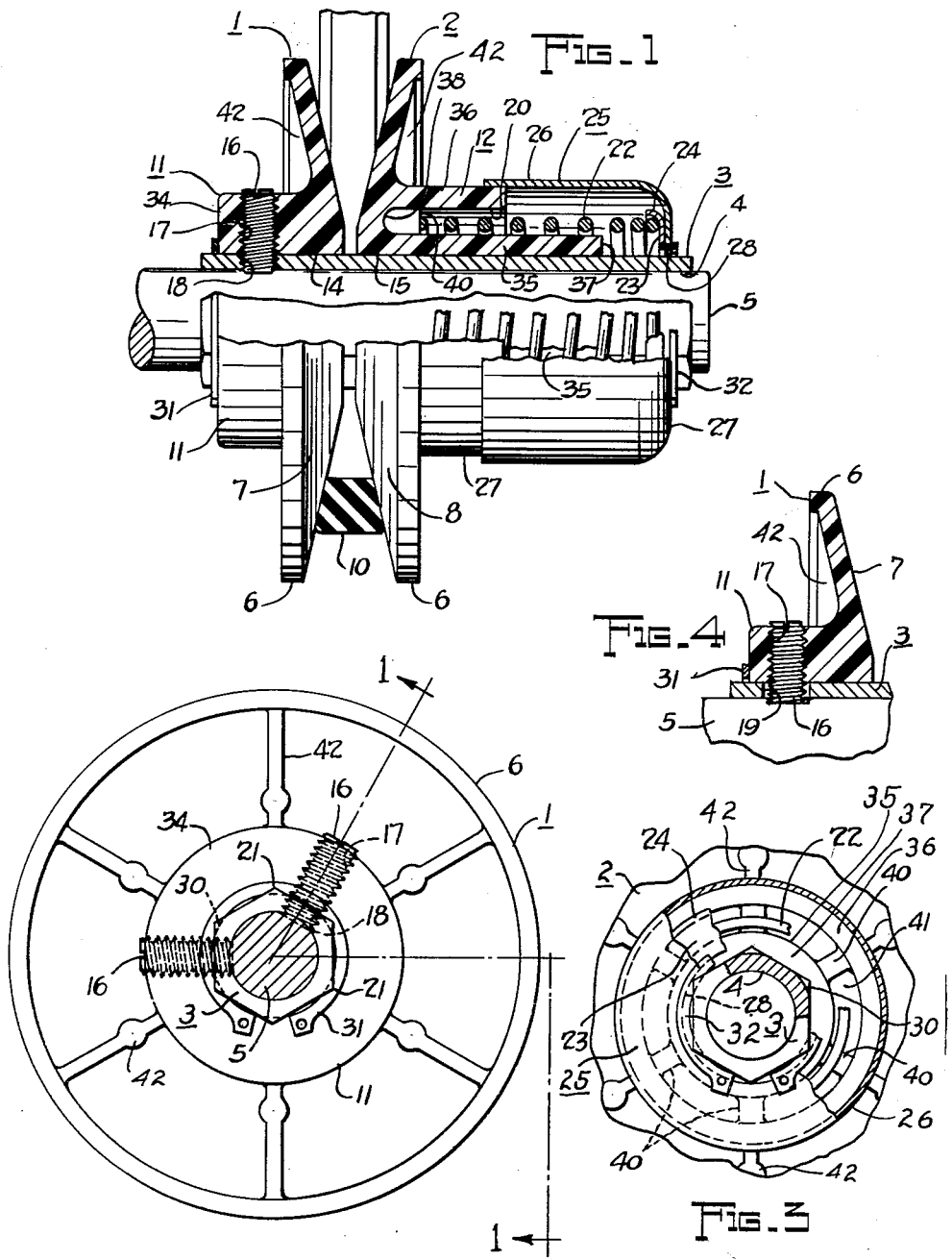

3,010,333
VARIABLE PITCH SHEAVE
John F. Rampe, 3417 Fairfax Road,
Cleveland Heights, Ohio
Filed Nov. 6, 1958, Ser. No. 772,309
13 Claims. (Cl. 74—230.17)

This invention relates to improvements in variable pulleys or sheaves of the type that are mounted on rotatable shafts for the purpose of driving or being driven by endless belts.

Pulleys or sheaves of the type referred to conventionally comprise a pair of discs having confronting tapered frusto-conical friction surfaces between which the endless belt is engaged. Relative axial movement of the discs alters the working diameter at which the belt is engaged, thereby varying the speed of the shaft on which the sheave is secured in relation to the speed of the belt. The discs on the sheave are conventionally biased toward one another by a helical coil spring. Thus, merely by changing the tension in the belt, the effective diameter of the sheave may be adjusted while the device is in operation.

The present invention aims to provide an adjustable sheave assembly in the form of a rugged, compact unit that is readily mounted on and removed from a circular sectioned shaft as a unit. More particularly this aspect of the invention is concerned with the use of plastic material for the discs so that they may be made inexpensively by conventional injection molding techniques and so that oil lubrication of the relatively movable disc is unnecessary. According to one aspect of this feature the discs are formed with radially thick or heavy sectioned hubs that are received on the polygonally shaped external surface of a thin walled metal mounting sleeve, the openings in the hub being complemental to the non-circular shape of the sleeve so as to resist relative rotation while permitting axial sliding movement. The thick sectioned hub of one of the discs receives a threaded set screw which extends through the thin walled mounting sleeve and is brought to bear directly against the shaft on which the device is mounted so that torque loads are transmitted directly between such shaft and the heavy sectioned plastic hub of the disc. The discs are splinely related to one another through the non-circular sleeve so that driving forces between the belt and both discs are transmitted to the shaft through the single set screw means threaded into the plastic material of the one fixed disc.

Another aspect of that feature of the invention having to do with the formation of the driving discs of molded plastic material is concerned with the provision of an annular channel or groove in the thick sectioned hub of the movable disc to accommodate a portion of the biasing spring. The annular groove opens axially through the outer end of the movable disc so that the spring can work in and out of such channel. In the bottom of the channel are formed a multiplicity of radial reinforcing ribs which provide spring seat lands each of which is circumferentially short. The axial thrust load of the spring is distributed evenly to a number of reinforced points spaced circumferentially about the entire extent of the annular groove in the disc hub. This employment of spaced radial ribs as spring seats also improves the molding of the disc and its physical characteristics.

A further objective is concerned with the locating and retaining of the discs, spring, and reaction elements on the mounting sleeve between and by means of rings that are readily removed and replaced. More specifically identified the rings are split and formed of spring metal and are received in circumferential grooves of the sleeve so that in replacement the rings snap into place and are held by their yielding grip on the sleeve.

Another feature and objective of the invention is the provision of a plastic walled chamber for the working spring so that spring friction is minimized without oil lubrication. Additionally, the spring chamber keeps the spring free of dust and dirt not only in normal use but also in shipping and storing the device.

Other objects and advantages relate to certain novel structural features and combinations and arrangements of parts as set forth in the following detailed description of preferred embodiments representing the best known mode of practicing the invention. This description is made with reference to the accompanying drawings forming a part of the specification. In the drawings:

FIG. 1 is an elevational view showing the device of the present invention mounted on the fragmentary end portion of a shaft; this view is partly in section and has parts broken away and removed to show the internal structure;

FIG. 2 is an elevational view of the left end of the device of FIG. 1;

FIG. 3 is a fragmentary elevational view of the right end of the device of FIG. 1; and FIG. 4 is a sectional detail corresponding to a fragment of the left end of FIG. 1, showing a modification.

The invention is illustrated in a device which comprises a pair of drive discs 1, 2 made preferably by molding of suitable material such as any of the well-known plastics of which structural shapes are formed and which possess self lubricating characteristics in relation to metal surfaces with which they may be engaged. A suitable material is nylon; such material, preferably reinforced as by glass fibers, has the desirable characteristics of strength, rigidity and wear resistance. The self lubricating feature referred to allows the movable disc to slide smoothly on a thin walled mounting sleeve 3 of steel or other suitable metal. This sleeve is of suitable non-circular external shape, such as the uniform or equilateral hexagon shown to advantage in FIGS. 2 and 3. Other polygonal shapes may, of course, be employed. The sleeve is of uniform section from end to end and has a through bore 4 of cylindrical shape to receive shaft 5 on which the device is mounted.

The discs 1, 2 have circular peripheries 6 concentric to the rotational axis of the device and are formed with confronting tapered or frusto-conical drive surfaces 7, 8 adapted to engage the sides of a suitable drive member such as an endless V-belt or A-belt of conventional type, a fragment of an A-belt being indicated at 10.

Hub portions 11, 12 of the discs 1, 2, respectively, are of relatively heavy section and are formed with axial through openings 14, 15 that are non-circular in section, the disc openings being complemental to the external shape of the mounting sleeve 3 so as to establish a non-rotative or splined connection between each disc and such sleeve. Molded on the outer faces of the discs 1, 2 are reinforcing ribs 42 which, at their inner ends, are joined to and integral with the hubs 11, 12.

A driving connection is established between the sheave device and the mounting shaft 5 by set screw means comprising one or more set screws 16 threaded radially through the thick sectioned plastic hub 11 of the disc 1, the set screw means extending through a threaded hole in the mounting sleeve 3 and being engaged directly against the cylindrical surface of the shaft 5. In the arrangement illustrated in FIGS. 1 and 2, the disc hub 11 and the sleeve 3 are formed with registered radial openings 17, 18 having internal threads that match the set screw threads so that the set screw is threadedly engaged in both the hub and the sleeve.

In the modified arrangement of FIG. 4, the sleeve 3 is formed with an unthreaded opening 19 that registers with the threaded opening 17 in the disc hub 11, the sleeve opening having a diameter greater than the crest diameter of the threads of the set screw 16 so that the set screw is received through the sleeve opening with a surrounding clearance. Thus, in the modified arrangement, torque loads are transmitted between the disc 1 and the shaft 5 solely through the set screw or screws 16. Since the discs 1 and 2 are both splinely related to the hexagonal sleeve 3, torque loads on the disc 2 are transmitted through the sleeve to the disc 1 and thence through the set screw means to the shaft 5. As shown in FIGS. 1, 2 and 4 the heavy sectioned plastic hub 11 throughout its axial length and circumferential extent is at least three times the maximum radial thickness of the mounting sleeve 3, a plastic hub of such dimensions having adequate body to frictionally retain the set screw means of substantially the same radial dimension and withstand the forces encountered in maintaining a proper driving connection between the sheave device and the shaft on which it is mounted.

By the arrangement described, wherein the set screw means is retained and supported primarily by the heavy sectioned plastic hub 11, the mounting sleeve 3 can be and is of thin walled lightweight construction. This is for the reason that it is unnecessary to have a radially thick section to provide sufficient stock in which to form threads to support the set screw means. Although the set screw means is threaded through the sleeve 3 in the embodiment of FIGS. 1 and 2, the threaded engagement between the set screw means and the mounting sleeve is not relied upon as the primary support or carrier for the set screw means.

The thick sectioned hub 12 of the disc 2 is formed with an annular channel or groove 20 concentric to the rotational axis of the device. This groove opens through the end of the hub which faces away from the disc having the set screw means and receives one end of a helical coil compression spring 22 which, as will appear, serves to bias the discs 1, 2 toward one another. A reaction element in the form of a circular ring 23 of stamped metal such as steel is received about the mounting sleeve 3 in spaced relation beyond the end of the hub 12 and provides a seat or primary retainer for the outer end of the coil spring 22. The outer periphery of the reaction ring is desirably formed with an axially directed curved section flange 24 which embraces the endmost turn of the spring and retains the spring in concentric relation to the sleeve 3.

A dust excluding cover or cap in the form of a stamped metal cup 25 is received about the outer end of the hub 12, the spring 22, the reaction ring 24 and the sleeve 3 and constitutes a secondary retainer for the spring. This cup has a cylindrical portion 26 that embraces and has telescopic sliding engagement with outwardly facing cylindrical surface 27 of the hub. The dust cup 25 has a bottom portion 27 formed with a central aperture so as to be received over and located in concentric relation to the mounting sleeve 3. The central hole in the reaction ring 23 and the hole 28 in the bottom of the dust cup may be either hexagonal to conform to the non-circular external shape of the sleeve 3 or, as shown, they may be circular with a diameter corresponding to a circle which circumscribes the hexagonal shape of the sleeve.

Adjacent its ends the mounting sleece 3 is formed across its hex corners with external grooves 30 into which spring metal retaining rings 31, 32 are snap fitted. These rings are split radially to permit them to be expanded mechanically in assembly; the rings contract by inherent resiliency when released to the relative size and shape shown, or smaller, and they seat themselves in the bottoms of the grooves 30, gripping the mounting sleeve 3. In projecting radially beyond the outside surfaces of the mounting sleeve, the snap rings 31, 32 constitute abutments between which are confined all those components of the device that are mounted on the sleeve 3. The snap rings 31, 32 are outside the other parts of the sheave which are received on the sleeve 3; that is, each ring is on that face or side of the particular disc or part with which it is associated and for which it is an abutment which faces away from the other snap ring. This feature permits the adjustable sheave or pulley devices of the present invention to be assembled in quantity ready for use. The stress in the spring 22 normally biases the movable disc 2 toward and, in the absence of the drive belt 10, against the fixed disc 1. The retainer ring 31, by engagement with end face 34 of the hub 11 prevents the disc 1 from being forced off the end of the mounting sleeve and thus constitutes a locator for such disc. The set screw means 16 can thus easily be removed and replaced in the hub of the disc even when the device is assembled with the spring 22 under compresison, the hub of the disc 1 being abutted and held by the spring against the locating ring 31 at one end of the sleeve and the dust cap 25 being abutted and held against the snap ring 32 at the other end of the sleeve.

The snap ring 32 is disposed outside both the dust cap 25 and the reaction ring 23 so that the compressed spring 22 holds the ring 23 against the inside of the cup bottom 27 and the latter against the locating and retaining ring 32.

As shown in FIG. 1, the annular groove 20 in the disc hub 12 separates a relatively long inner portion 35 of the hub from a relatively short outer portion 36. The inner portion 35 embraces and is guided on the mounting sleeve 3 for axial sliding movement. The opening through the cup portion 35 has a hexagonal shape complemental to that of the mounting sleeve in the provision of the splined relationship previously referred to. Outer end face 37 of the hub inner portion 35 is engageable with the reaction ring 23 to limit the sliding movement of the disc 2 on the mounting sleeve. The axial length of the outer portion 36 of the disc hub 2 is of sufficient axial length to maintain sealing relation with the cylindrical portion 26 of the dust cup 25 when the discs 1 and 2 are engaged.

Extending radially across the annular groove or channel 20 at its bottom 38 are a plurality of internal ribs or lands 40 which are formed integrally with and of the reinforced plastic material of the disc 2 during the formation of such disc in a conventional injection molding process. These ribs or lands 40 are circumferentially spaced from one another about the annular groove, are connected to both the inner and the outer hub portions 35, 36, and constitute separated pads against which the endmost turn of the spring 22 is seated. The individual ribs 40 are generally of less circumferential extent than the intervening spaces or voids, being located in radial alignment with the external reinforcing ribs so as to transmit loads on such external ribs to the inner hub portion 35.

The present invention thus provides a variable sheave or pulley of metal and molded plastic parts adapted to be quickly and inexpensively assembled in production as a unit for easy mounting on and demounting from a shaft. The sheave unit is compact, slidingly engaged bearing surfaces and the spring are enclosed against dust and dirt, and the discs and the spring, together with related parts, are retained on the mounting sleeve even though the set screw means be withdrawn from the sleeve. The engagement of the set screw means in the heavy bodied hub of one of the plastic drive discs permits both discs to be mounted on and splinely related by a lightweight sleeve of thin radial section.

In accordance with the patent statutes the principles of the present invention may be utilized in various ways, numerous modifications and alterations being contemplated, substitution of parts and changes in construction being resorted to as desired, it being understood that the embodiments shown in the drawings and described above are given merely for purposes of explanation and illustration without intending to limit the scope of the claims to the specific details disclosed.

What I claim and desire to secure by Letters Patent of the United States is:

1. A variable sheave comprising a thin walled metal sleeve of uniform section from end to end having an external surface of non-circular shape and being adapted for mounting on a shaft, a pair of circular discs received on the sleeve in coaxial spaced apart relation, said discs having confronting frusto-conical drive surfaces, said discs having hub portions formed with non-circular axial through openings matching the external surface of the sleeve and splinely relating the discs to the sleeve, screw means extending radially through aligned openings in the hub portion of one of the discs and the sleeve for direct engagement with such a shaft and to locate the one disc on and in predetermined axial relation to the sleeve, said screw means being in threaded frictional engagement with the hub portion of the one disc throughout substantially the entire radial dimension of the hub portion whereby torque loads are transmitted directly between the one disc and such a mounting shaft by the screw means upon tightening the latter against the shaft, retainer means surrounding the sleeve and having a through opening larger than the sleeve through which the sleeve is received, the sleeve being formed with axially spaced circumferentially extending external grooves, one of said grooves being outside the hub of the one disc and another being outside the hub of the other disc and said retainer means, an helical coil spring embracing the sleeve, said spring reacting against said retainer means and the hub of said other disc to bias the latter toward the first disc, a first resilient snap ring yieldingly embracing the sleeve and located in and projecting radially from said one groove to engage the hub of the one disc and in the absence of said set screw means to locate the one disc on the sleeve with the hub and sleeve openings in registry, and a second resilient snap ring yieldingly embracing the sleeve and located in and projecting radially from said other groove as a stop locating the retainer means on and in predetermined axial relation to the sleeve and resisting axial thrust of the spring, the spring normally reacting against the discs and the retainer means to bias them against the first and second snap rings, respectively, the snap rings being radially and selectively removable from their respective grooves and the discs, spring and retainer means being removable axially from the sleeve upon removal of the screw means and either one of the snap rings.

2. A variable sheave comprising a thin walled metal sleeve of uniform section from end to end having an external surface of non-circular shape and being adapted for mounting on a shaft, a pair of circular discs received on the sleeve in coaxial spaced apart relation, said discs having confronting frusto-conical drive surfaces, said discs having hub portions formed with non-circular axial through openings matching the external surface of the sleeve and splinely relating the discs to the sleeve, screw means threaded through one of the discs and adapted to bear against such a shaft for securing said one disc against relative rotation, the other disc having a hub portion formed with concentric inner end and outer portions separated by an annular groove concentric to the sheave axis and open axially through the end of said hub portion, said other disc including a plurality of integral radially extending internal ribs bridging the bottom portion of said annular groove at circumferentially spaced points, a coil spring and reaction ring means embracing the sleeve, and means locating the reaction means on the sleeve in predetermined position, the spring being compressed axially between the reaction ring means and said other disc, extending into the annular groove in the hub portion of said other disc and reacting against a plurality of said radial ribs.

3. A sheave as in claim 2 having a plurality of integral reinforcing ribs on said other disc, said reinforcing ribs each being connected at one end to and extending radially outwardly from the hub portion of such other disc, and each reinforcing rib being radially aligned with one of the internal ribs to effect direct transmission of forces from the reinforcing ribs to the inner hub portion across the internal ribs.

4. In a sheave structure, a thin walled sleeve adapted for mounting on a shaft, a disc on the sleeve and including a hub portion with a radial thickness at least three times the maximum radial thickness of the sleeve, set screw means threadedly engaged in the hub portion throughout the major part of the radial dimension of the latter and adapted for engagement with such a shaft to transmit torque loads between such shaft and the disc, said sleeve being of substantially uniform section and having a non-circular external profile in radial cross section, and the hub portion of the disc having a non-circular passage in which the sleeve is received, the hub passage matching the sleeve profile in the provision of a direct splined interlock independent of the set screw means preventing relative rotation of the sleeve in the disc while permitting relative axial sliding in assembly and disassembly.

5. In a sheave structure as defined in claim 4, the sleeve being formed with a radial hole aligned with the thrust axis of the set screw means and through which the set screw means is projected for shaft engagement, the projected set screw means constituting an axial locator for and providing an interlock between the disc and the sleeve.

6. In a sheave structure as defined in claim 5, snap ring means embracing and interlocked with the sleeve and, independent of the set screw means, locating the disc axially on and confining it within predetermined axial limits of the sleeve to maintain the disc and the sleeve in assembled relation upon removal of the set screw means.

7. In a sheave structure as defined in claim 4, the sleeve profile being polygonal in shape, the sleeve having a plurality of angularly disposed flat surfaces, and the thrust axis of the set screw being substantially normal to one of said flat surfaces.

8. In a sheave structure as defined in claim 7, the sleeve being formed with a radial opening through and normal to one of its flat surfaces and the set screw means being adapted to be projected through such opening for shaft engagement.

9. In a sheave structure as defined in claim 4, a second disc on the sleeve in confronting relation to the first mentioned sleeve, said second disc having a non-circular passage in which the sleeve is received and which matches the sleeve profile in the provision of a splined interlock preventing relative rotation of the sleeve and the second disc whereby the discs are locked against relative rotation through their splined relation to the common sleeve and torque applied to the first mentioned disc through the set screw means is transmitted to the sleeve directly by such first disc and to the second disc by the sleeve.

10. In a sheave structure as defined in claim 9, snap ring means embracing and interlocked with the sleeve at axially spaced points outside the discs and adjacent but spaced axially inwardly from the sleeve ends, said ring means confining the discs between said points and retaining the discs assembled on the sleeve, and removal of the snap ring means from either one of said points and the set screw means from said hub portion permitting disassembly of the discs from the sleeve by axial removal of the discs over such one point of the sleeve and off the sleeve end adjacent to such one point.

11. In a sheave structure as defined in claim 10, means resiliently biasing the discs toward one another and reacting against the snap ring means.

12. In a sheave structure as defined in claim 11, a cup shaped dust cap on the sleeve, a reaction ring on the sleeve within the cap, and the biasing means comprising a spring reacting against the reaction ring, the reaction ring being interposed between the spring and the cap with the spring enclosed within the latter, and the cap being interposed between the reaction ring and the snap ring means at one of said points.

13. In a sheave structure, a thin walled metal sleeve of uniform section from end to end having an external polygonal shape comprising a plurality of angularly disposed flat surfaces and being adapted for mounting on a shaft, a circular disc of plastic material received on the sleeve, said disc having a relatively thick sectioned integral hub portion formed with a non-circular axial through opening matching the external shape of the sleeve for splinely relating the disc to the sleeve, the radial thickness of the hub portion of said disc being at least three times the maximum radial thickness of the sleeve, said hub portion of the disc and the sleeve being formed with radial holes aligned with one another, the hole in the sleeve opening through and being normal to one of said flat surfaces, and set screw means extending through the aligned holes for direct engagement with such a shaft and locating the disc on and in predetermined axial relation to the sleeve, said screw means being in threaded frictional engagement with the hub portion of the disc throughout substantially the entire radial dimension of the hub portion, torque loads applied to the disc being transmitted directly between the disc and the sleeve independently of the set screw.

References Cited in the file of this patent

UNITED STATES PATENTS

| | | |
|---|---|---|
| 534,976 | Sperry | Feb. 26, 1895 |
| 2,291,600 | Atkinson | Aug. 4, 1942 |
| 2,321,438 | Tyler | June 8, 1943 |
| 2,475,954 | Gerbing | July 12, 1949 |
| 2,599,821 | Friedman et al. | June 10, 1952 |
| 2,809,531 | Moyer | Oct. 15, 1957 |
| 2,842,355 | Lang | July 8, 1958 |